United States Patent [19]
Sullivan et al.

[11] 3,731,748
[45] May 8, 1973

[54] MULTIPLE PLOW HITCH

[75] Inventors: James Franklin Sullivan, East Moline; Loren Glenn Arnold, Rock Island, both of Ill.

[73] Assignee: Deere & Company, Moline, Ill.

[22] Filed: Feb. 23, 1971

[21] Appl. No.: 118,017

[52] U.S. Cl. .................172/314, 172/413, 172/421
[51] Int. Cl. .............................................A01b 49/00
[58] Field of Search......................172/613, 657, 658, 172/314, 319, 401, 413, 421; 280/411; 60/52 HE

[56] References Cited

UNITED STATES PATENTS

| | | |
|---|---|---|
| 2,515,016 | 7/1950 | McClintock........................172/314 X |
| 2,768,567 | 10/1956 | Tinkess et al......................172/401 X |
| 2,136,550 | 11/1938 | Howard.............................172/314 X |
| 3,239,014 | 3/1966 | Oerman et al......................172/314 X |
| 3,236,313 | 2/1966 | Arnold et al.......................172/421 X |
| 3,630,290 | 12/1971 | Williams et al....................172/413 X |

*Primary Examiner*—Robert E. Pulfrey
*Assistant Examiner*—Stephen C. Pellegrino
*Attorney*—H. Vincent Harsha, Harold M. Knoth, William A. Murray, John M. Nolan and Raymond L. Hollister

[57] ABSTRACT

A pair of drawn plows are connected in echelon by an elongated hitch tube which has its front and rear ends connected to the forward ends of the drawbars of the front and rear plows respectively. The rear portion of the hitch tube is also connected to the rear portion of the forward plow by a laterally extending parallel linkage and is raised and lowered relative to the frame of the front plow by an extensible and retractable hydraulic cylinder which is connected in series with an extensible and retractable hydraulic cylinder for raising and lowering the frame of the front plow on its rear furrow wheel. This structure provides a constant hitch height for the rear plows.

13 Claims, 4 Drawing Figures

Patented May 8, 1973

INVENTORS
J. F. SULLIVAN
L. G. ARNOLD

Patented May 8, 1973

INVENTORS
J. F. SULLIVAN
L. G. ARNOLD 3,731,748

MULTIPLE PLOW HITCH

BACKGROUND OF THE INVENTION

The present invention relates generally to plows, and in particular relates to a hitch device for connecting drawn plows in echelon.

Many multiple plow hitches have heretofore been proposed, but each has had its disadvantages. The typical multiple plow hitch includes an elongated draft tube which has its forward end interconnected with the forward end of the drawbar of the front plow and its rear end connected to the drawbar of the rear plow. The rear end of the tube was maintained in a position spaced from the forward plow by a link or links extending between the frame of the forward plow and the tube. In at least one commer-cially successful hitch device the positioning link was held in a fixed vertical position with respect to the frame of the front plow. An example of such a hitch device is illustrated in U. S. Pat. No. 3,239,014 which issued 8 Mar. 1966 to O. W. Oerman et al.

When the positioning link for the draft tube is maintained at a fixed position with respect to the frame of the front plow, it is subject to a considerable downward force and often fails. For example, when approaching the end of a field, the front plow is raised first and the rear plow is not raised until it reaches the end of the field. During the time between the raising of the front and rear plows the drawbar of the rear plow is raised so it is not in a direct line with the drawbar of the tractor and the draft forces of the rear plow provide a downward force on the positioning link.

SUMMARY OF THE INVENTION

The principal object of the present invention is to provide a hitch device for connecting a pair of plows in echelon which maintains a constant hitch height for the rear plow.

A more specific object of the present invention is to provide a multiple plow hitch which includes an elongated hitch or draft tube having its front and rear ends connected to the forward ends of the drawbars of front and rear plows respectively, positioning link means pivotally connected to the rear of the hitch tube and the rear of the front plow, and means acting between the positioning link means and the rear of the front plow to maintain a constant hitch height for the rear plow.

Another object of the present invention is to provide a multiple plow hitch in which the movements of the positioning link with respect to the front plow is controlled by an extensible and retractable hydraulic cylinder which is connected in series with an extensible and retractable hydraulic cylinder for raising and lowering the frame of the front plow on its rear furrow wheel so that each time the frame of the front plow is raised or lowered on its rear furrow wheel, the positioning link is moved relative to the frame a corresponding amount in an opposite direction to maintain a constant hitch height for the rear plow.

The above objects and additional objects and advantages will become apparent to those skilled in the art from a reading of the following detailed description of a preferred embodiment of the invention when taken in conjunction with the accompanying drawings.

DESCRIPTION OF THE PREFERRED EMBODIMENT

Figures 1, 3:
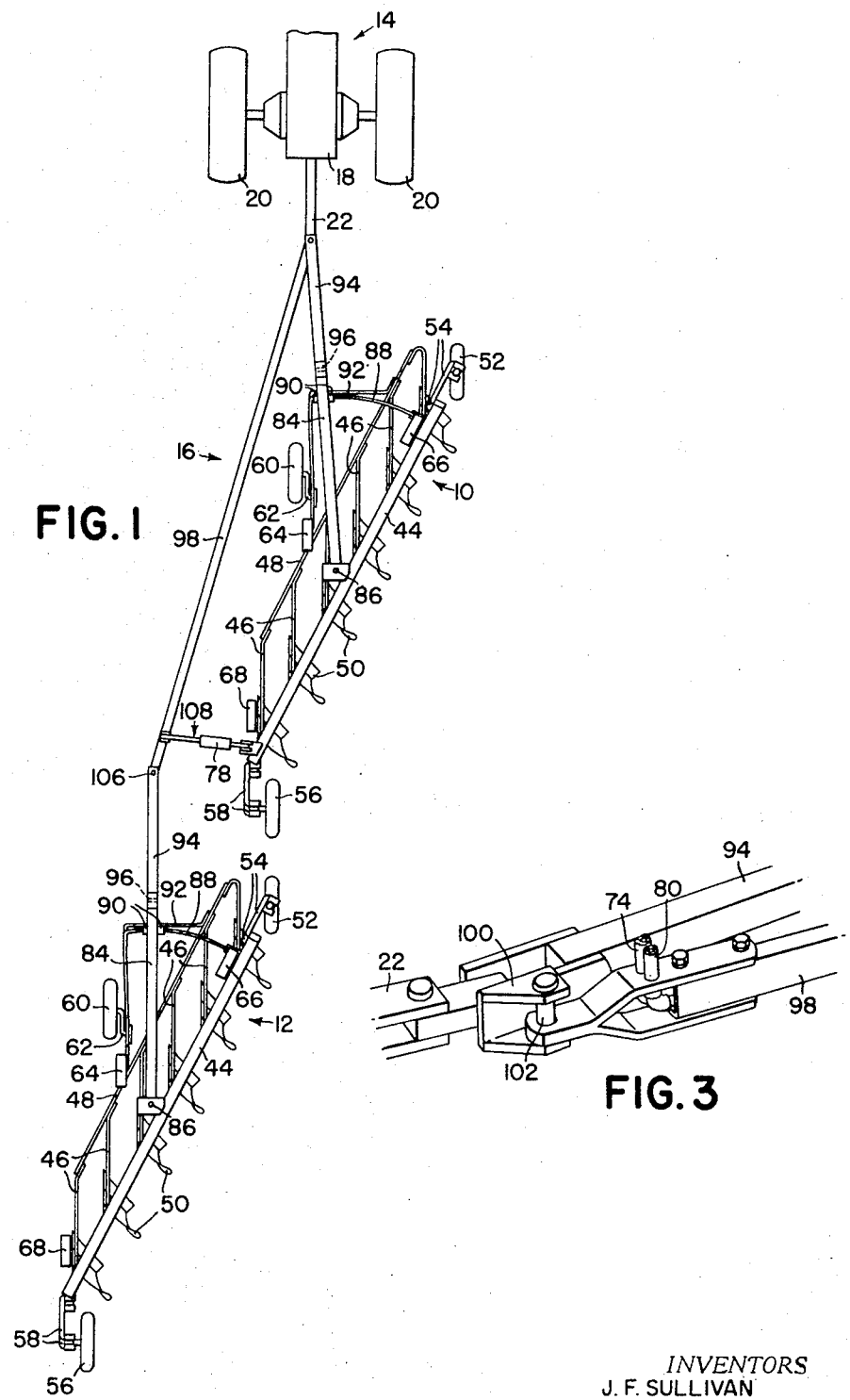
FIG. 1 is a top plan view of a pair of plows connected in echelon by a hitch constructed in accordance with the principles of the present invention.
FIG. 3 is a perspective view of the connection between the drawbar of the front plow and the forward end of the hitch; and, FIG. 4 is a schematic view of the hydraulic system for the plows and hitch device illustrated in FIG. 1.

Referring now to the drawings, a pair of front and rear plows indicated generally as 10 and 12, respectively, are illustrated as being connected to a tractor 14 by a multiple plow hitch 16. The tractor is of conventional construction and includes a main frame 18 supported by rear traction wheels 20 and forward steerable wheels (undisclosed), a rearwardly extending drawbar 22 and a hydraulic system (see FIG. 4). The tractor hydraulic system includes a pump 24, a fluid reservoir 26 and a pair of directional flow control valves 28 and 30. The pump and reservoir are connected to one side of both valves by fluid lines 32 and 34, respectively, and the opposite side of each valve is connected to a pair of remote function outlets 36 and 38 by fluid lines 40 and 42. Each of the valves and its associated outlets represent the control and connection of one remote function of the tractor hydraulic system.

The plows 10 and 12 are of like construction so like parts on the two plows will be designated by the same reference numeral. Each of the plows includes a main frame consisting of an obliquely extending box beam 44, a plurality of forwardly extending frame bars 46 having their rear ends secured to the box beam, and an obliquely extending frame bar 48 secured to and interconnecting the frame bars 46. A plurality of plow bottoms 50 are secured to and depend from the frame of each plow.

Figure 4:
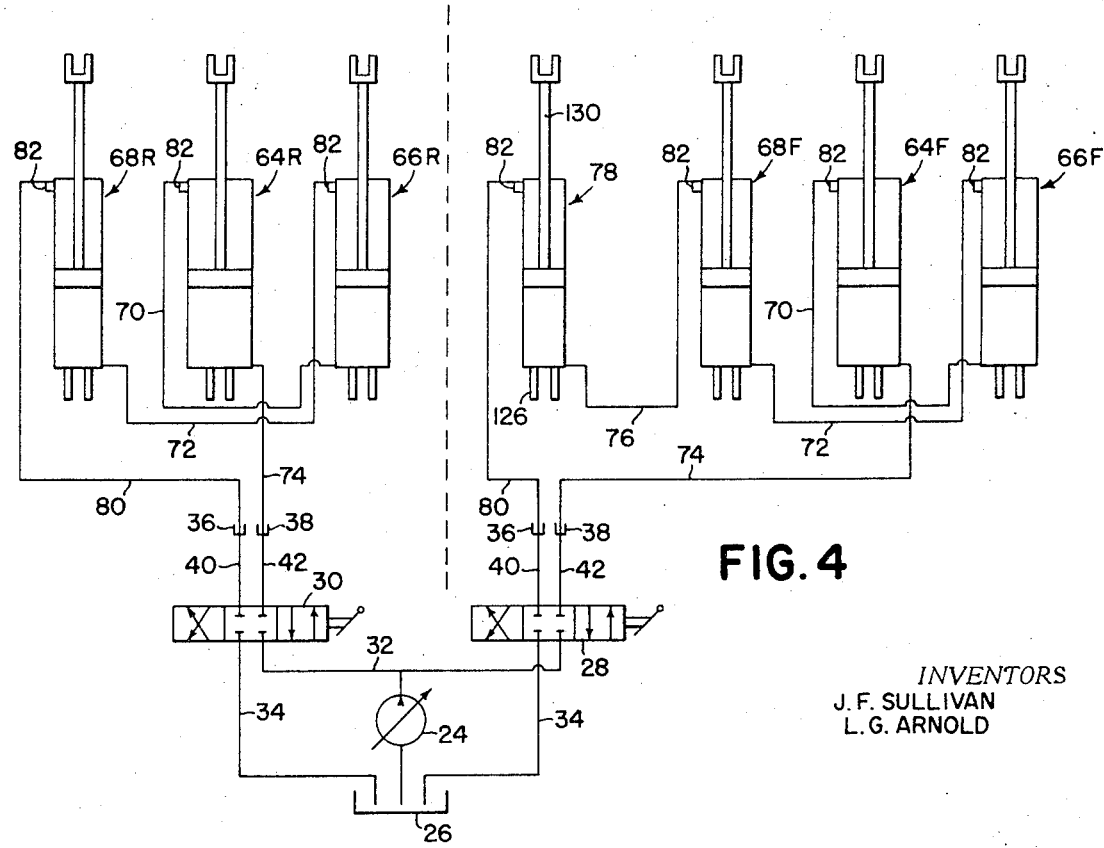

The forward end of each frame is adjustably supported on a front furrow wheel 52 by a pair of parallel links 54, on a rear furrow wheel 56 by a pair of parallel links 58, and on a land wheel 60 by a crank axle 62. The frame of each plow can be raised and lowered on its land wheel, rear furrow wheel and front furrow wheel by double-acting extensible and retractable hydraulic cylinders 64, 66 and 68 respectively. In FIG. 4 the numerals for the hydraulic cylinders 62, 64 and 66 have been suffixed by the letters R for "rear" and F for "front" to distinguish the hydraulic systems for the two plows. Each of the cylinders 62, 64 and 66 is operatively connected to the frame and the supporting structure for its respective wheel so that upon extension the frame is raised and upon retraction the frame is lowered.

The cylinders for each plow are connected in series for simultaneous operation. To this end, the rod ends of cylinders 64 F and R are connected to the anchor ends of cylinders 66 F and R by fluid lines 70 and the rod ends of cylinders 66 F and R are connected to the anchor ends of cylinders 68 F and R by fluid lines 72.

The anchor ends of cylinders 64 F and R are connected to the remote outlets 38 associated with the valves 28 and 30, respectively, by fluid lines 74. The rod end of cylinder 68 F is connected, by a fluid line 76, to the anchor end of an additional double-acting extensible and retractable hydraulic cylinder 78 which is used to control the hitch height of the rear plow as will be explained hereinafter. To complete the hydraulic circuits, the rod ends of cylinders 78 and 68 R are connected to the remote outlets 36 associated with the valves 20 and 30, respectively, by fluid lines 80.

With the cylinders connected in series in the manner described, movement of the valve 28 to the left will effect simultaneous extension of all the cylinders on the front plow to raise the front plow and movement of the valve 28 to the right will effect simultaneous retraction of all the cylinders on the front plow to lower the front plow. Likewise, movement of the valve 30 to the left will effect simultaneous extension of all the cylinders on the rear plow to raise the rear plow and movement of the valve 30 to the right will effect simultaneous retraction of all the cylinders on the rear plow to lower the rear plow.

In order to achieve equal extension and retraction of the cylinders, the cylinders in each series are of matched displacement. That is, the stroke of all the cylinders are equal, and the effective cross-sectional area of the rod end of each cylinder is equal to the effective cross-sectional area of the anchor end of the cylinder to which it is connected.

Each cylinder is provided with a bypass circuit 82 at its rod end which permits free flow of fluid through the cylinder when the rod is fully extended. The bypass circuits provide for ease of assembly since it is not necessary to precharge the fluid lines, and they also compensate for any leakage past one of the pistons of the cylinders by synchronizing the cylinders each time the plows are fully raised.

Each of the plows 10 and 12 also includes an elongated hitch frame 84 which has its rear end pivotally connected to an intermediate portion of the box beam 44 by a pivot pin 86. The forward portion of the hitch frame is slidably supported by an arcuate guide bar 88 and held in adjusted position on the guide bar by clamps 90. The guide bar 88 has one end secured to the box beam 44 and its other end supported by a right-angle bar 92 which is secured to the frame bar 48 and also serves to mount the crank axle 62 for the land wheel 60. A forwardly extending drawbar 94 has its rear end pivotally connected to the forward end of the hitch frame 84 by a transversely extending horizontal pin 96 for vertical swinging movement, and the drawbar 94 for the forward plow 10 is connected to the tractor drawbar 22.

Figure 2:
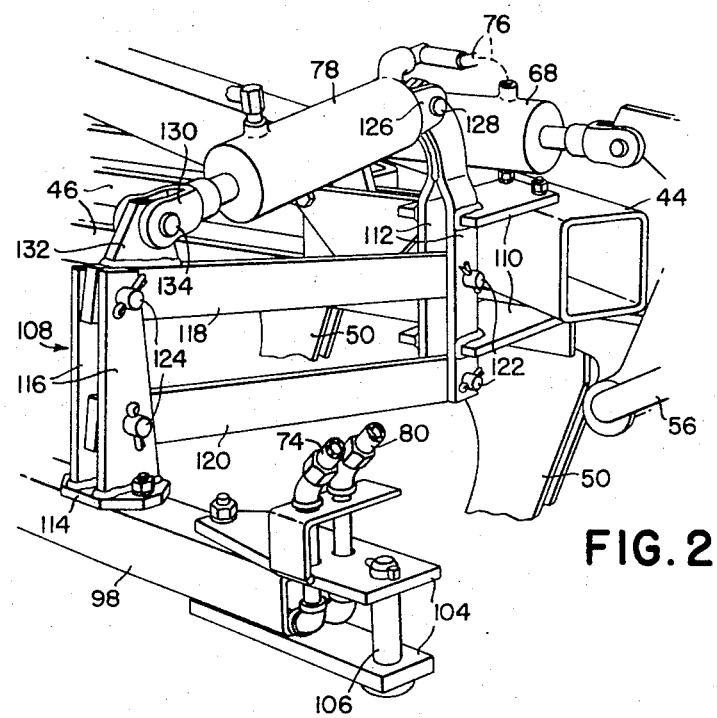
FIG. 2 is a perspective view of the connection between the hitch and the rear of the front plow.

The multiple plow hitch includes an elongated hitch or draft tube 98 which has its forward end connected to a bracket 100 on the forward end of the drawbar of the plow 10 by a pin 102. As an alternative, the forward end of the hitch tube 98 could be secured directly to the tractor drawbar and the drawbar of the plow 10 secured to a bracket mounted on the side of the hitch tube. A pair of apertured plates 104 are secured to the rear end of the hitch tube 98 and the forward end of the drawbar of the plow 12 is secured between the plates 104 by a pin 106. As can be seen from FIGS. 2 and 3, the fluid lines 74 and 80 which connected the cylinders on the rear plow with the outlets 36 and 38 associated with the valve 30 extend through the hollow hitch tube 98.

The rear end of the hitch tube 98 is maintained at a constant height and spaced from the rear of the plow 10 by a positioning link assembly indicated generally at 108. The positioning link assembly includes a first mounting bracket consisting of a pair of plates 110 which are secured to a rear end portion of the box beam 44 on the plow 10 and a pair of spaced, vertical anchor arms 112 secured to the plates 110 in any suitable manner such as welding. A second mounting bracket consists of a base plate 114 secured to the top side of the hitch tube and a pair of spaced upstanding anchor arms 116 secured to the base plate 114 in any suitable manner such as welding. A pair of upper and lower parallel links 118 and 120 have their inner ends pivotally connected between the anchor arms 112 by pins 122 and their outer ends pivotally connected between the anchor arms 116 by pins 124. The first and second brackets and the parallel links 118 and 120 form a four-bar linkage.

The hydraulic cylinder 78 completes the positioning link assembly. The upper ends of the anchor arms 112 converge and the anchor end 126 of the hydraulic cylinder 78 is pivotally connected thereto by a pin 128. The rod 130 of cylinder 78 is pivotally connected to a lug 132 by a pivot pin 134. The lug 132 is secured to an outer portion of the upper link 118 by welding or the like.

The purpose of the positioning link assembly is twofold. First, it counteracts the side force which is the result of the plow 12 being disposed to the side of the center line of draft of the tractor, and thus maintains the rear of the hitch tube in a position spaced from the rear of the plow 10 so that the plow 12 is properly positioned with respect to the plow 10. Secondly, the positioning link assembly maintains a constant hitch height for the plow 10. This is accomplished by the serial connection between the cylinders 78 and 68. For example, when the valve 28 is moved to the left to extend the cylinders on the plow 10 to raise the plow 10, the cylinder 78 is also extended to lower the rear of the hitch tube relative to the frame of the plow 10 and thereby maintains the rear of the hitch tube at a constant vertical position with respect to the ground.

From the foregoing description of a single preferred embodiment of the invention, it can be seen that the present invention provides a novel multiple plow hitch which overcomes all the problems associated with previous multiple plow hitches.

Although only a single preferred embodiment of the invention has been described and illustrated, various modifications within the spirit and scope of the invention will become apparent to those skilled in the art, and these modifications can be made without departing from the underlying principles of the invention.

We claim:

1. Hitch structure for connecting a pair of towed plows in echelon with each plow including a frame adjustably mounted on wheels for vertical movement, means acting between the frame and wheels to vertically move the frame on the wheels between raised transport and lowered working positions, and forwardly extending draft structure having a rear portion pivotally connected to the frame so that its forward portion can remain in a substantially constant vertical position with respect to the ground surface as the frame is moved between its raised and lowered positions, the hitch structure including a hitch tube having its forward end operatively connected to the forward end of the draft structure for the front plow and extending rearwardly to a rear end adjacent the rear portion of the forward plow, means on the rear end of the hitch tube for connection with the forward end of the draft structure for the rear plow, support means connected between a rear portion of the forward plow and a rear portion of the hitch tube for maintaining the rear portion of the hitch tube spaced from the ground surface and the forward plow, and the support means including means maintaining the rear portion of the hitch tube in a fixed vertical position with respect to the ground surface irrespective of vertical movement of the rear portion of the forward plow with respect to the ground surface.

2. The hitch structure set forth in claim 1 wherein the support means includes a first bracket secured to the hitch tube adjacent the rear end thereof, a second bracket secured to the forward plow adjacent the rear end thereof, and a pair of rigid upper and lower links each having its opposite ends pivotally connected to the first and second bracket.

3. The hitch structure set forth in claim 2 wherein the means for maintaining the rear portion of the hitch tube in a fixed vertical position with respect to the ground surface includes extensible and retractable hydraulic cylinder means anchored between the second bracket and one of the links.

4. The combination of first and second drawn plows arranged in echelon and each including a frame adjustably supported on a forward wheel, rear furrow wheel means, and a land wheel, means for raising and lowering the frame on the wheels between raised transport and lowered working positions, and forwardly extending draft structure, the draft structure having a pivotal connection with the frame whereby, upon vertical movement of the frame the forward end of the draft structure can maintain a constant vertical position with respect to the group surface, and hitch means interconnecting the plows including a hitch tube having its forward end operatively connected to the forward end of the draft structure for the forward plow and its rear end connected to the forward end of the draft structure for the rear plow, support means connected between the hitch tube and the frame of the forward plow maintaining the rear portion of the hitch tube spaced from the ground surface and the forward plow, and the support means including means maintaining the rear portion of the hitch tube in a fixed vertical position with respect to the ground surface irrespective of vertical movement of the rear portion of the frame of the forward plow with respect to the ground surface.

5. The combination set forth in claim 4 wherein the support means includes link means having an inner end pivotally connected to a rear portion of frame of the forward plow and an outer end pivotally connected to the hitch tube adjacent the rear end thereof, and the means maintaining the rear portion of the hitch tube in a fixed vertical position includes means operatively connected between the link means and the frame of the forward plow and responsive to upward movement of the frame of the forward plow to move the outer end of the link means downwardly with respect to the frame a corresponding amount and to downward movement of the frame of the forward plow to move the outer end of the link means upwardly with respect to the frame a corresponding amount.

6. The combination set forth in claim 4 wherein extensible and retractable hydraulic cylinder means is operatively connected between the frame and rear furrow wheel means of the forward plow to raise and lower the frame of the forward plow on its rear furrow wheel means, the means connected between the frame of the forward plow and the link means includes an extensible and retractable hydraulic cylinder means having one end pivotally connected to the frame and another end pivotally connected to the link means, and wherein fluid line means interconnects the cylinder means connected between the frame and link means in series with the cylinder means connected between the frame and rear furrow wheel means.

7. The combination set forth in claim 6 wherein each of the hydraulic cylinder means includes a cylinder having an anchor and a rod end and a piston and rod assembly slidably mounted therein with the rod projecting from the rod end of the cylinder, the anchor end of the cylinder of the cylinder means for the furrow wheel means is pivotally connected to the frame and the rod thereof is pivotally connected to the furrow wheel means so that upon extension and retraction the frame is raised and lowered, respectively, on the furrow wheel means, the anchor end of the cylinder of the cylinder means connected between the frame and link means is pivotally connected to the frame above the pivotal connection between the frame and link means and the rod thereof is pivotally connected to the link means so that upon extension and retraction the rear portion of the hitch tube is lowered and raised, respectively, with respect to the frame of the forward plow, and the fluid line means interconnects the rod end of the cylinder for the furrow wheel means with the anchor end of the cylinder for the hitch tube.

8. The combination set forth in claim 7 wherein the effective cross-sectional area of the rod end of cylinder for the furrow wheel means is equal to the effective cross-sectional area of the anchor end of the cylinder for the hitch tube.

9. The combination set forth in claim 8 wherein each of the cylinders is provided with a bypass circuit means which affords free flow of fluid through the cylinders when they are fully extended whereby the cylinder means will be synchronized each time the frame is fully raised on the rear furrow wheel means.

10. The combination set forth in claim 7 wherein a first bracket is secured to the frame of the forward plow, a second bracket is secured to the rear portion of the hitch tube, and the link means includes a pair of upper and lower links having their ends pivotally connected to the first and second brackets whereby the brackets and links form a four-bar linkage.

11. For use with a tractor having a drawbar and a hydraulic system with at least two independently operable remote functions, first and second drawn plows arranged in echelon and each including a frame adjustably mounted on wheel means and having a plurality of extensible and retractable hydraulic cylinder means operatively connected between the frame and wheel means to raise and lower the frame on the wheel means between raised transport and lowered working positions, forwardly extending draft structure pivotally connected to the frame, fluid line means connecting the hydraulic cylinders on each plow in series and including means for connection with one of the remote functions on the tractor whereby the two plows can be raised and lowered independently, means on the forward end of the draft structure of the first plow for connection with the tractor drawbar, and means connecting the plows in echelon including an elongated hitch tube having its forward and rear ends connected to the forward ends of the draft structure for the first and second plows respectively, and support means for the rear end of the hitch tube including link means having an inner end pivotally connected to the frame of the first plow and an outer end pivotally connected to the hitch tube, an additional extensible and retractable hydraulic cylinder means operatively connected between the frame of the first plow and the link means to lower and raise the hitch tube relative to the frame of the first plow, and additional fluid line means connecting the additional hydraulic cylinder means in series with the serially connected cylinder means for raising and lowering the first plow, whereby, when the frame of the first plow is raised or lowered on the wheel means, the rear end of the hitch tube is moved relative to the frame of the first plow a corresponding amount in the opposite direction and is thereby maintained at a substantially constant height.

12. The invention set forth in claim 11 wherein the effective cross-sectional area of each cylinder means is equal to the effective cross-sectional area of the cylinder means to which it is connected by the fluid line means so that the cylinder means on each plow are simultaneously moved through equal distances.

13. The invention set forth in claim 12 wherein each cylinder means is provided with a bypass circuit means which provides free flow of fluid through the cylinder means when their respective frame is fully raised to thereby synchronize the cylinder means each time their respective frame is fully raised.

* * * * *